US010909594B2

United States Patent
Handelman

(10) Patent No.: US 10,909,594 B2
(45) Date of Patent: Feb. 2, 2021

(54) METHOD, MEDIUM, AND SYSTEM FOR TRANSACTION SECURITY BY DETERMINING TRENDS USING N-GRAMS

(71) Applicant: PayPal, Inc., San Jose, CA (US)

(72) Inventor: Tomer Handelman, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 108 days.

(21) Appl. No.: 16/384,649

(22) Filed: Apr. 15, 2019

(65) Prior Publication Data

US 2020/0327590 A1   Oct. 15, 2020

(51) Int. Cl.
*G06Q 30/00* (2012.01)
*G06Q 30/06* (2012.01)
*G06Q 20/40* (2012.01)
*G06F 40/284* (2020.01)

(52) U.S. Cl.
CPC ....... *G06Q 30/0609* (2013.01); *G06F 40/284* (2020.01); *G06Q 20/4016* (2013.01); *G06Q 30/0627* (2013.01); *G06Q 30/0643* (2013.01)

(58) Field of Classification Search
CPC .......... G06Q 30/0609; G06Q 30/0643; G06Q 30/0627; G06Q 30/0185; G06Q 20/4016; G06F 40/284
See application file for complete search history.

(56) References Cited

U.S. PATENT DOCUMENTS

2008/0115214 A1 * 5/2008 Rowley ............... G06F 21/6209
726/22

OTHER PUBLICATIONS

Almendra, Vinicius, and Denis Enachescu. "A supervised learning process to elicit fraud cases in online auction sites." 2011 13th International Symposium on Symbolic and Numeric Algorithms for Scientific Computing. IEEE, 2011. (Year: 2011).*

* cited by examiner

*Primary Examiner* — Matthew E Zimmerman
(74) *Attorney, Agent, or Firm* — Haynes and Boone, LLP

(57) ABSTRACT

Descriptions of items are offered for sale by one or more merchants in an online marketplace. The online marketplace comprises a website hosted by a server. The descriptions are electronically scanned or otherwise accessed. The scanned descriptions are deconstructed into a plurality of N-grams. Each N-gram includes a combination of words appearing in the descriptions of items. The electronic scan and deconstruction are repeated over a plurality of predefined time periods. For each N-gram, a frequency of occurrence is monitored in each of the predefined time periods. Based on the monitoring, a determination is made that a first N-gram of the plurality of N-grams whose frequency of occurrence has exceeded a predefined threshold in one of the predefined time periods. Risks of transactions involving one or more items whose descriptions contain the first N-gram are evaluated.

20 Claims, 8 Drawing Sheets

METHOD, MEDIUM, AND SYSTEM FOR TRANSACTION SECURITY BY DETERMINING TRENDS USING N-GRAMS

BACKGROUND

Field of the Invention

The present invention generally relates to electronic transaction security, and more particularly to machine learning for generating and using N-grams to automatically determine which items are trending in an online marketplace, according to various embodiments.

Related Art

Rapid advances have been made in the past several decades in the fields of computer technology and telecommunications. As a result, these advances allow more and more transactions to be conducted online. For example, buyers and sellers may engage in electronic transactions with one another using an online marketplace. In addition to offering simplicity and speed to facilitate the transactions, the online marketplaces also provide relative anonymity for the parties involved in the transaction, as well as opening up items for sale to a much larger audience. Unfortunately, some fraudsters have taken advantage of these characteristics of online transactions to defraud potential buyers. For example, the fraudsters may list items for sale on the online marketplace but send fake or counterfeit items to the buyers, or not even send any items to the buyers at all after receiving payment from the buyer. Often times, the items involved in these fraudulent transactions are popular or trendy items, since these types may command a high profit margin and attract the interest of many buyers. However, conventional systems have not been able to accurately identify which items are more likely to be trendy or otherwise to be of interest to more potential buyers and thus are more likely to be involved in fraudulent transactions. What is needed is a system and method to automatically identify which items are currently trending and are likely to be involved in prospective transactions that are potentially fraudulent, so that additional scrutiny and/or increased security may be applied to these potentially transactions.

Figure 1:
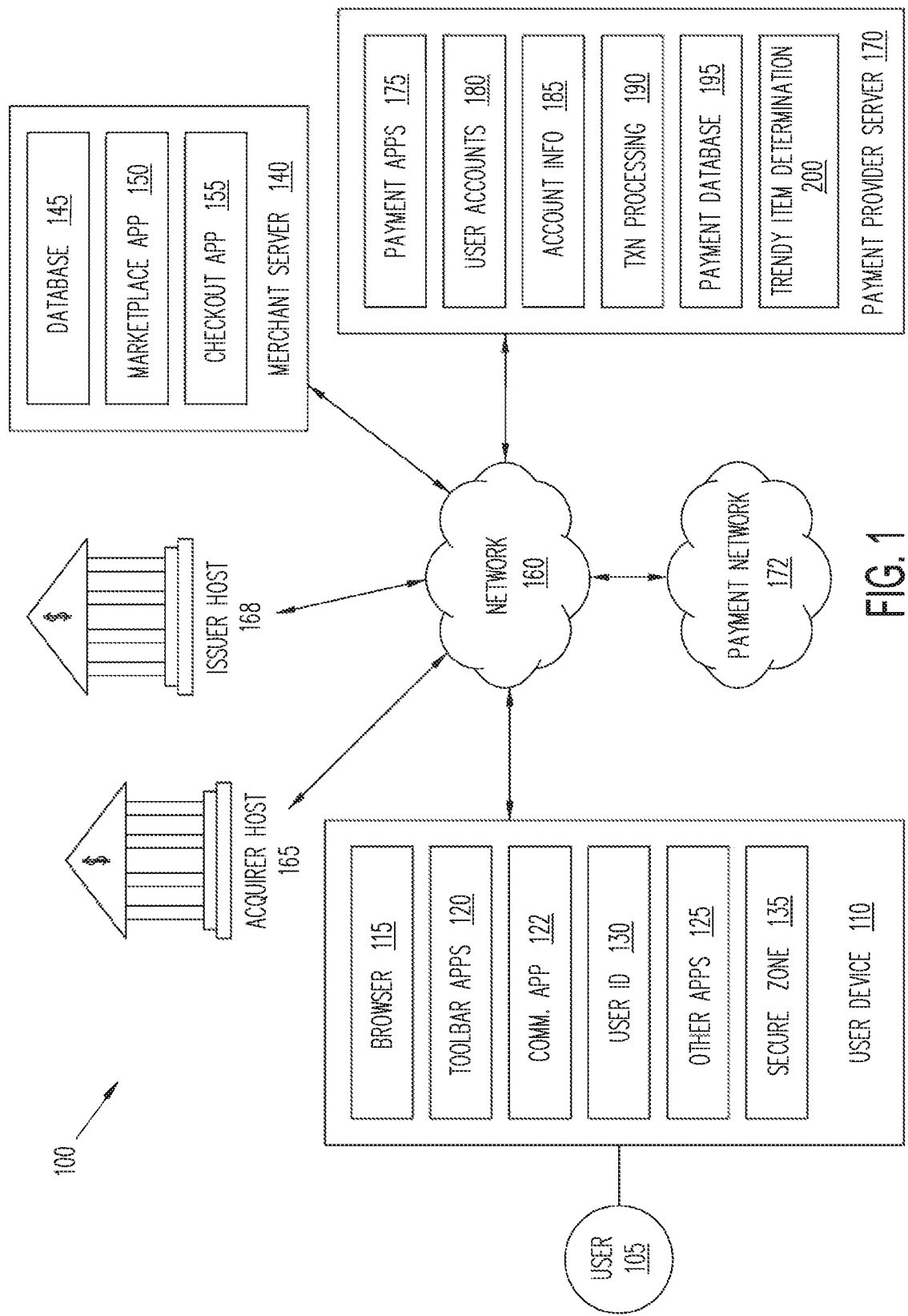
FIG. 1 is a block diagram of a networked system according to various aspects of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to systems and methods of automatically identifying items that are currently trending in an online marketplace, which could present a heightened fraud risk. For example, a computer program (which may be implemented in the form of a computer application or a module) is configured to periodically sample the various items listed for sale in an online marketplace (e.g., eBay™), for example by electronically scanning a description of each of the listings. The description may include a title of an item for sale, a brief description of the item for sale, a detailed description of the item for sale, etc. The descriptions may have been entered by merchants as text strings in various text entry fields of an item listed for sale and may be stored in an electronic database, for example the database of the entity that is hosting the online marketplace. The computer program may retrieve the stored text strings and conduct the electronic scanning. Based on the electronic scan, the computer program decomposes each scanned text string into a plurality of N-grams, which may be a sequence of N consecutive words from the text string. In some embodiments, the computer program decomposes each scanned text string into bi-grams (e.g., two consecutive words in a string). The electronic scanning and the decomposition of the item descriptions may be repeated periodically over a period of time, for example once an hour, once a day, once a week, once a month, etc. Note that the period of time may vary within the day or other time period, e.g., the time period may be shorter on the days leading up to Valentine's Day or other shopping period or event that typically has higher numbers of purchases.

The computer program monitors the frequency of occurrence of each N-gram in the descriptions over the period of time. For example, if the electronic scanning and the decomposition discussed above is repeated on a daily basis, the computer program may count the number of each N-gram on a daily basis or a weekly basis. If any particular N-gram experiences a sudden uptick—which may be measured by the number of the N-gram exceeding a predefined threshold—the N-gram (and/or the item associated with the N-gram) may be determined to be trending or trendy (note that the terms trending and trendy may be used hereinafter interchangeably). Trending items are often involved in high risk transactions, because the seller may be able to attract interest in the item from a large pool of potential buyers. In addition, trending items may be pricey (e.g., a new mobile smartphone), which could give a fraudulent seller a big financial windfall based on a fraudulent transaction involving the trending item. Accordingly, the transaction risks of trending items may be evaluated at a heightened level of scrutiny, especially if the seller has a small sales volume and/or a significant portion (e.g., a majority) of the seller's merchandise is comprised of trending items. Similarly, the computer program may detect sellers that are not necessarily selling trendy items, but that are becoming trendy for whatever reason. For example, a seller may be selling auto parts. Typically, the seller may sell 10 auto parts per day. However, in the past few weeks, the seller is suddenly selling 1000 auto parts per day, even though the auto parts involved in the transactions are not trendy themselves. This sudden spike in the amount of non-trendy goods involved in the seller's transactions may still be an indicator that the seller poses a high fraud risk. The computer program may identify these sellers by monitoring the frequency of occurrence of any given seller's name and determining whether it exceeds a predetermined threshold during a predefined period.

The present disclosure mitigates transaction risks by automatically identifying the transactions (or sellers) that are risky (based on their association with trending items) before the transaction is conducted/completed. These transactions then undergo a more scrutinized review to detect potential fraud. By catching fraud in a more targeted fashion, the present disclosure reduces financial losses incurred due to fraud and offers greater customer satisfaction. The various aspects of the present disclosure are integrated into a practical application to solve problems that specifically occur in a computer networking context. For example, a software program running on a server is able to quickly and accurately determine which items are becoming trendy in an online marketplace, so that potential fraud involving these items may be detected and prevented in a timely manner. The various aspects of the present disclosure are discussed in more detail with reference to FIGS. 1-8.

FIG. 1 is a block diagram of a networked system 100 or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100. User device 110 may also include other applications 125, for example the mobile applications that are downloadable from the App-store™ of APPLE™ or GooglePlay™ of GOOGLE™.

In conjunction with user identifiers 130, user device 110 may also include a secure zone 135 owned or provisioned by the payment service provider with agreement from device manufacturer. The secure zone 135 may also be part of a telecommunications provider SIM that is used to store appropriate software by the payment service provider capable of generating secure industry standard payment credentials as a proxy to user payment credentials based on user 105's credentials/status in the payment providers system/age/risk level and other similar parameters.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

According to various aspects of the present disclosure, the merchant server 140 may also host a website for an online marketplace, where sellers and buyers may engage in purchasing transactions with each other. The descriptions of the items or products offered for sale by the sellers may be stored in the database 145. For example, the descriptions of the items may be generated (e.g., by the sellers) in the form of text strings. These text strings are then stored by the merchant server 140 in the database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, a trend detection program 200 may also be implemented on the payment provider server 170. The trend detection program 200 may include one or more software applications or software programs that can be automatically executed (e.g., without needing explicit instructions from a human user) to perform certain tasks. For example, the trend detection program 200 may access the database 145 on the merchant server 140 to retrieve the descriptions of the items offered for sale. The trend detection program 200 breaks down the strings contained in the item descriptions into a plurality of N-grams (e.g., bi-grams), which may be a contiguous sequence of N words from the text string. The trend detection program 200 may keep doing this on a regular basis, for example on a daily, weekly, bi-weekly, or monthly basis, or on a basis based on anticipated busy or slow shopping periods, including when a new version or product is announced and available for purchase. For each N-gram, the trend detection program 200 may monitor how frequently it appears in these results. For example, the trend detection program 200 may construct a time series graph that indicates how often any particular N-gram appears over a period of time (e.g., how often an N-gram appears on a weekly basis over a period of 6 months). If any N-gram has a sudden spike (e.g., beyond a predetermined threshold), it may indicate that the N-gram and the item associated with the N-gram are becoming trendy. As discussed above, trendy items are favored by fraudsters and therefore may entail a higher transaction risk. Accordingly, the trend detection program 200 may apply a greater level of scrutiny against transactions involving trendy items.

It is understood that although the item description data is typically stored in the database 145 on the merchant server 140, it may be stored in the payment database 195 on the payment provider server 170 as well. Further, although the trend detection program 200 is illustrated as being separate from the transaction processing application 190 in the embodiment shown in FIG. 1, the transaction processing application 190 may implement some, or all, of the functionalities of the trend detection program 200 in other embodiments. In other words, the trend detection program 200 may be integrated within the transaction processing application 190 in some embodiments. In addition, it is understood that the trend detection program 200 (or another similar program) may be implemented on the merchant server 140, or even on a portable electronic device similar to the user device 110 as well.

Still referring to FIG. 1, the payment network 172 may be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
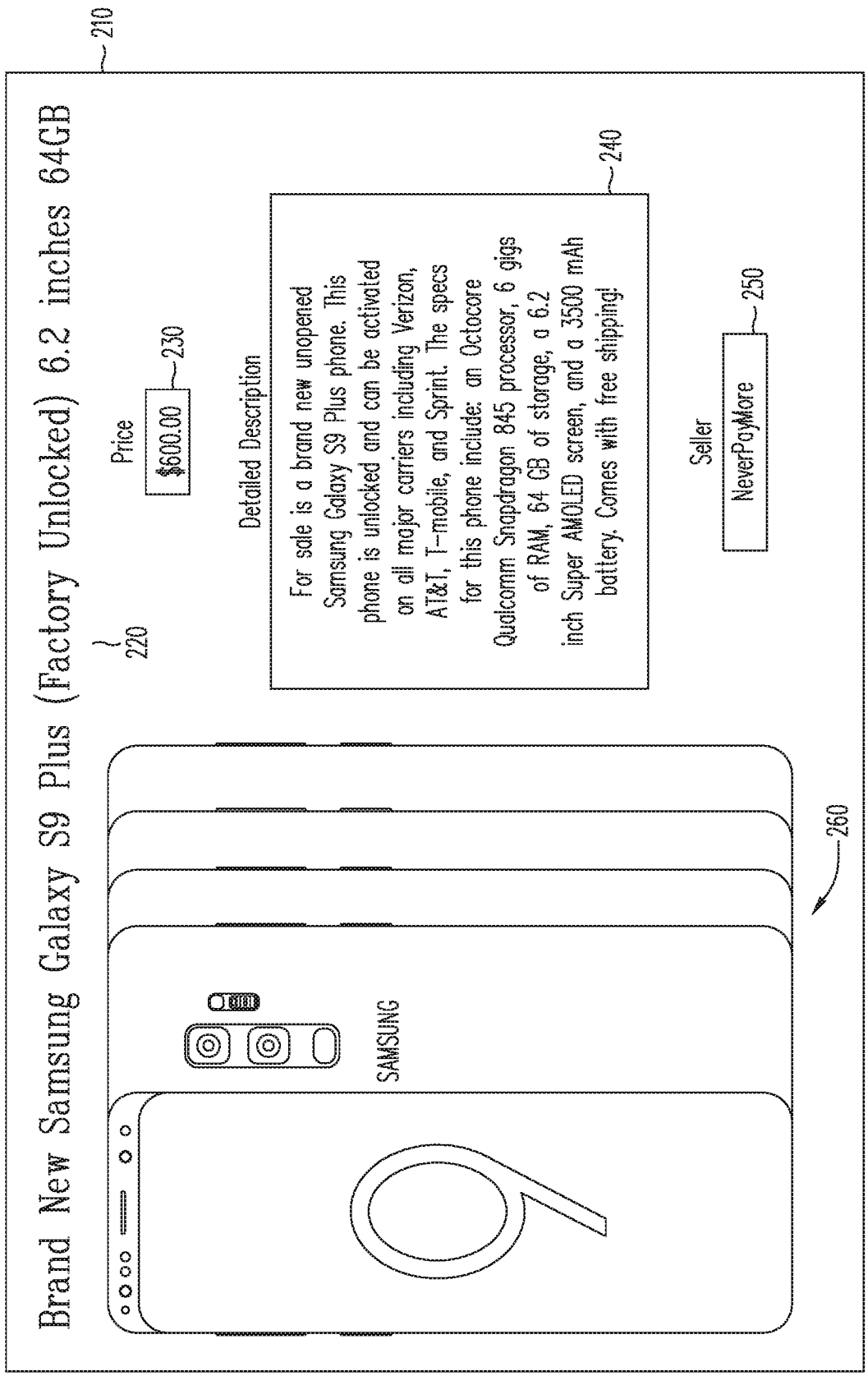
FIG. 2 is a simplified listing of an item for sale in an online marketplace according to various aspects of the present disclosure.

FIG. 2 illustrates an example listing of an item for sale in an online marketplace. The item listing is presented via a website 210 that is hosted by an entity, for example the merchant server 140 or the payment provider server 170 of FIG. 1 discussed above. The website 210 may include various descriptions of the item, such as: a title 220 of the item, a price 230 of the item, a detailed description 240 of the item, a seller 250 of the item, and a picture 260 of the item. In the simplified example shown in FIG. 2, the title 220 may read "Brand New Samsung Galaxy S9 Plus (Factory Unlocked) 6.2 inches 64 GB", the price 230 may be "$600", the detailed description 240 may read "For sale is a brand new unopened Samsung Galaxy S9 Plus phone. This phone is unlocked and can be activated on all major carriers including Verizon, AT&T, T-mobile, and Sprint. The specs for this phone include: an Octocore Qualcomm Snapdragon 845 processor, 6 gigs of RAM, 64 GB of storage, a 6.2 inch Super AMOLED screen, and a 3500 mAh battery. Comes with free shipping!", and the seller 250 may be "NeverPayMore". It is understood that the types of descriptions (and their contents) of the item shown in FIG. 2 are merely examples and are not intended to be limiting. Other types of descriptions may also be included in the website 210.

Typically, when a seller (e.g., the seller NeverPayMore) lists an item for sale, he/she may enter some of the descriptions of the items as text entries, such as the title 220, the price 230, the detailed description 240, and the seller 250. These text entries may be stored electronically by the entity that is hosting the online marketplace, for example in the database 145 of the merchant server 140 or in the database 195 of the payment provider server 170. According to embodiments of the present disclosure, the stored text strings of some of these descriptions of the items may be deconstructed into N-grams to detect trends.

Figure 3:
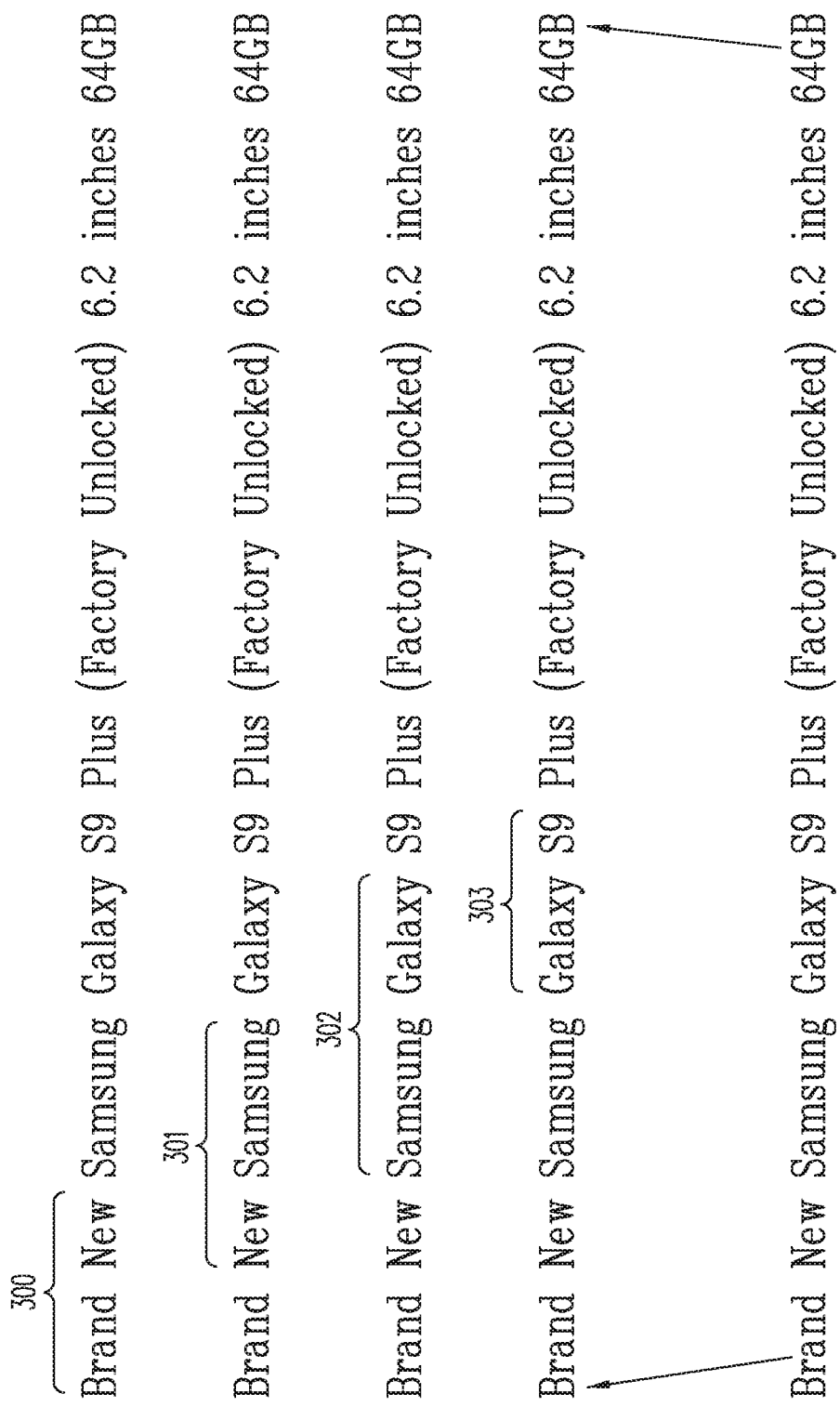
FIG. 3 illustrates a scheme for generating N-grams from a text string according to various aspects of the present disclosure.

In more detail, referring now to FIG. 3, an example decomposition of a text string into a plurality of N-grams is illustrated. As an example, the text string being decomposed can be the title 220 of the item shown in FIG. 2, but it is understood that any text string may be decomposed into N-grams. An N-gram may be a contiguous sequence of N words from a given text string, where N corresponds to the number of the words in the N-gram. For example, a uni-gram corresponds to a single word in a text string, a bi-gram corresponds to two consecutive words in the text string, a tri-gram corresponds to three consecutive words in the text string, etc.

As an example, FIG. 3 illustrates the decomposition of the text string (of the title 220) into a plurality of different bi-grams. In more detail, the words "Brand New" form a bi-gram 300, the words "New Samsung" form a bi-gram 301, the words "Samsung Galaxy" form a bi-gram 302, and the words "Galaxy S9" form a bi-gram 303. It is understood that the rest of the text string (of the title 220) forms additional bi-grams, but these additional bi-grams are not specifically illustrated herein for space considerations and also for reasons of simplicity. As an example, listed below is example computing programming code for decomposing a text string into bi-grams:

```
def generate_bi_grams(sentence):
    sentence_parts = sentence.split( )
    bi_grams =[ ]
    for i in range(0,len(sentence_parts)-1):
        bi_grams.append(sentence_parts[i]+"_"+sentence_parts[i+1])
    return bi_grams
```

Using the text string "I am going to school" as an example, applying the above code to that text string will generate the big-grams "I am", "am going", "going to", and "to school."

It is also understood that although FIG. 3 illustrates the decomposition of a text string into N-grams using the title 220 as an example, the N-grams may also be obtained by decomposing other text strings, such as the text strings corresponding to the detailed description 240.

The decomposed bi-grams may be used to determine what items are becoming trendy, as discussed in more detail below. However, it is understood that the present disclosure is not limited to bi-grams and may also apply to other types of N-grams such as unigrams, tri-grams, etc. In that regard, had the title 220 been decomposed into uni-grams, the corresponding uni-grams would just be the different words in the title 220. Had the title 220 been decomposed into tri-grams, the corresponding tri-grams would have been "Brand New Samsung", "New Samsung Galaxy", "Samsung Galaxy S9", "Galaxy S9 Plus", etc. The uni-grams or tri-grams can also be used to detect what items are becoming trendy. However, compared to bi-grams, uni-grams may have a high recall (e.g., high coverage) but may not include sufficient specificity (e.g., low precision) to identify the trending items. On the other hand, the tri-grams may include enough specificity (e.g., high precision) but low recall (e.g., low coverage) so that some potentially trending items may not be caught, for example if the description or title of such items may miss one of the word of the tri-gram. Therefore, bi-grams represent a good balance between precision and recall/coverage. Nevertheless, other types of N-grams such as uni-grams or tri-grams may be used in alternative embodiments to detect trending items, based on what factors are more important, such as precision, recall/coverage, etc.

Regardless of what text strings (e.g., which descriptions of the items) and what type of N-grams are used for the decomposition, the N-grams obtained as a result of the decomposition may be used to detect trends in the items. In more detail, the trend detection program 200 may sample X number of transactions from every merchant of the online marketplace at an interval, for example on an hourly basis, a daily basis, a weekly basis, a monthly basis, etc. The number X may be any suitable integer, for example 1 or 2. In other words, one or two transactions may be randomly sampled by the trend detection program 200 at planned intervals (e.g., daily, weekly, etc.). It is understood that the number of samples (e.g., the number X) taken may be the same for large merchants and small merchants alike, in order to prevent the resulting data from being skewed in favor of large merchants that may have a lot more items for sale than small merchants. As such, the sampling scheme of the present disclosure ensures that the trendy items are trendy in the whole online marketplace, and not just items that are trendy within the inventory offered by one or more large merchants.

After the item descriptions (e.g., their corresponding text strings) are decomposed into N-grams, the resulting N-grams are collected and counted at predefined time periods. For example, if the N-gram decomposition process is performed on a daily basis, the resulting N-grams may be counted on a daily basis, a weekly basis, or a monthly basis. This may be done for each different N-gram. Throughout this process, the N-grams that are most indicative of the trendy items will emerge. For example, using the title 220 discussed above, the bi-gram "Brand New" may be obtained as a result for many other items (e.g., "Brand New Watch" or "Brand New Basketball"). Accordingly, the number count of this bi-gram is unlikely to experience a sudden change over time. On the other hand, the bi-gram "Galaxy S9" is unique to the phone Samsung™ Galaxy™ S9. Before this phone is released to the public, there will be very few merchants offering the phone for sale. As such, the bi-gram "Galaxy S9" collected on a daily or weekly basis is likely to be very low. However, around the time of the release of the phone, or shortly thereafter, many merchants may be offering the phone for sale. As a result, the bi-gram "Galaxy S9" will experience a sudden uptick in its daily or weekly count. A non-limiting example of this situation is shown by table 1 below, or by the graph 400 shown in FIG. 4, which visually illustrates how the number count of the bi-gram "Galaxy S9" changes over time.

TABLE 1

| Week | Bi-gram | Count |
| --- | --- | --- |
| 1 | Galaxy S9 | 0 |
| 2 | Galaxy S9 | 0 |
| 3 | Galaxy S9 | 0 |
| 4 | Galaxy S9 | 0 |
| 5 | Galaxy S9 | 0 |
| 6 | Galaxy S9 | 0 |
| 7 | Galaxy S9 | 0 |
| 8 | Galaxy S9 | 40 |

TABLE 1-continued

| Week | Bi-gram | Count |
| --- | --- | --- |
| 9 | Galaxy S9 | 130 |
| 10 | Galaxy S9 | 202 |
| 11 | Galaxy S9 | 296 |
| 12 | Galaxy S9 | 313 |

Figure 4:
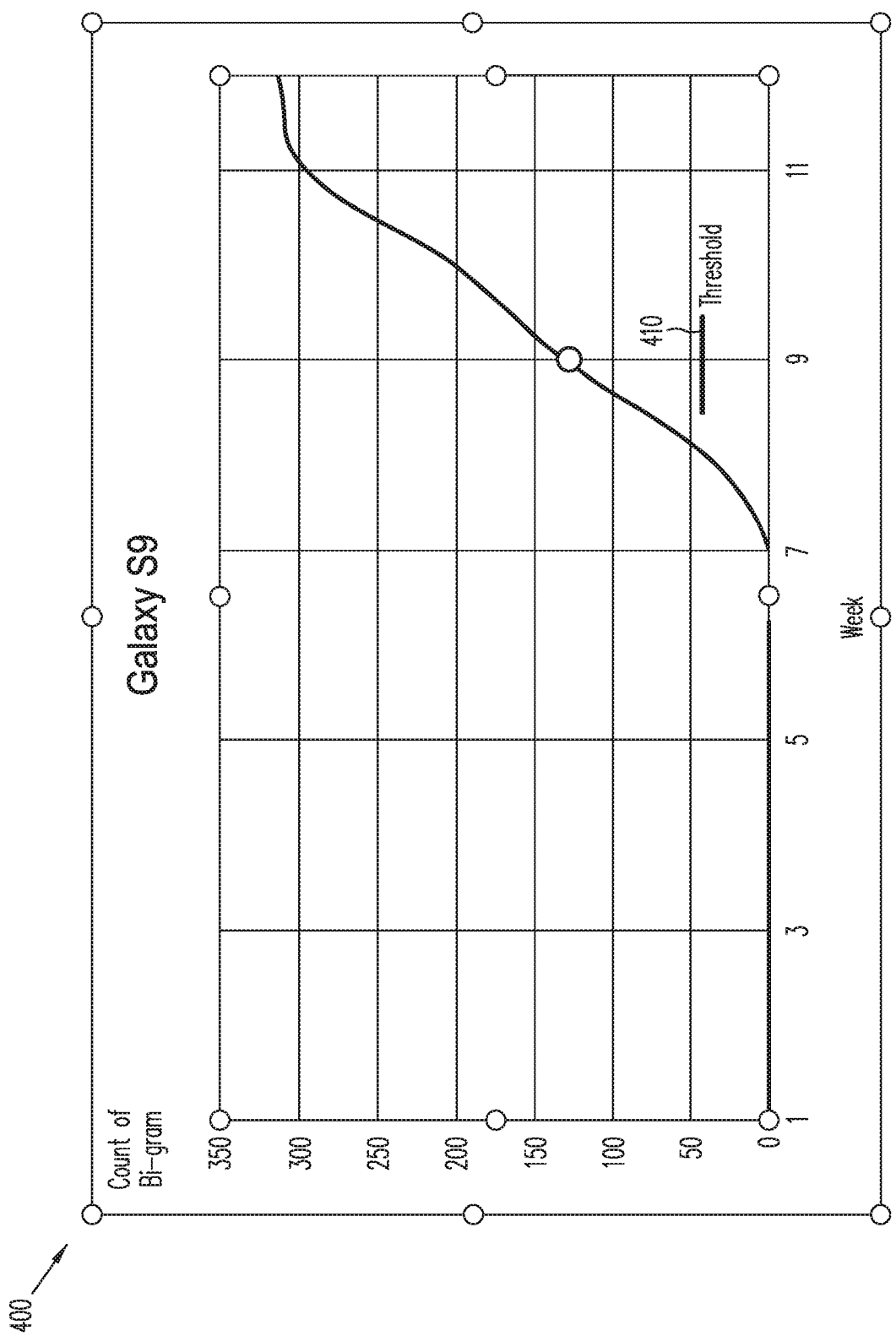
FIG. 4 illustrates a graph illustrating a time series of an N-gram according to various aspects of the present disclosure.

As shown in table 1 above and in the graph 400 of FIG. 4, the count of the bi-gram "Galaxy S9" is 0 throughout weeks 1-7. This is because the Samsung Galaxy S9 phone has not been released by the manufacturer, and thus no merchants are offering it for sale in the online marketplace. As such, the bi-gram "Galaxy S9" does not appear in any of the descriptions (e.g., title or detailed description) of items for sale in the online marketplace in weeks 1-7. Starting at week 8, however, the Samsung Galaxy S9 phone is released, or its release is pending. As a result, merchants in the online marketplace may start listing the phone for sale, or for presale if the phone has not been released but its release is imminent. This is reflected in the rise of the count of the bi-gram "Galaxy S9" from 0 to 40 in week 8. After the release of the phone in week 8 (or week 9), more and more merchants are listing the phone for sale, which is reflected in the sudden uptick of the count of the bi-gram "Galaxy S9" from 40 to 130 in week 9. Thereafter, due to the popularity of the phone, the count of the bi-gram "Galaxy S9" continues to increase in weeks 10, 11, and 12, with the numbers 202, 296, and 313, respectively.

Based on table 1 above and the graph 400 illustrated in FIG. 4, it can be seen that the bi-gram "Galaxy S9" became trendy (or has obtained a status as being trendy) some time during weeks 8-12. In some embodiments, the exact time at which the bi-gram "Galaxy S9" is determined to be trending may be calculated using a moving average and moving standard deviation. For example, the moving average for the count of the bi-gram "Galaxy S9" is calculated by summing the count of the bi-gram for the past weeks and then dividing by the number of weeks. At week 9 (and assuming the 4 weeks preceding week 1 also have a count of 0), the moving average is (0*11+40)/12=3.33. In other words, for the 12 weeks leading up to week 9, the moving average of the count of the bi-gram "Galaxy S9" is 3.33. For ease of reference, the moving average of the count is interchangeably referred to as MA hereinafter.

The moving standard deviation is calculated by: multiplying the MA with the number of weeks preceding the most recent week, adding that product with the count of the preceding week minus the MA, and taking the square root of the result. Plugging in the numbers herein, the moving standard deviation (hereinafter referred to as MSD) may be calculated as $$\sqrt{\frac{11*3.33^2 + (40-3.333)^2}{12}} = 11.05.$$

In other words, for the 12 weeks leading up to week 9, the moving standard deviation (MSD) of the count of the bi-gram "Galaxy S9" is 11.05.

A trendy item threshold—above which any given bi-gram is considered to be trending—may be defined as a function of the MA and the MSD. For example, a threshold for the bi-gram "Galaxy S9" may be defined as MA+5*MSD, which would yield a value of 58.58 using the MA and MSD numbers from the example discussed above. Of course, the number 5 is adjustable and may vary from bi-gram to bi-gram, or based on the product or merchant. For example, a first bi-gram derived from a technology product such as a smartphone may need to be a first number of MSDs above the MA to be considered trending, whereas a second bi-gram derived from a clothing item such as shoes may need to be a second number of MSDs above the MA to be considered trending. Stated differently, different types of items (or even items of the same type) may have different thresholds to be considered trending. Furthermore, it is understood that using MA and MSD to determine the trending threshold is merely an example and is not intended to be limiting. For example, in other embodiments, the thresholds may be set as a hard number (e.g., 100), or as a percentage increase of the number of a previous time period (e.g., 200% from a preceding week to a subsequent week), etc.

In some embodiments, the threshold 410 may be adjusted up or down based on an action rate. In more detail, an action rate may refer to a situation where a transaction involving an item that has been determined to be sufficiently risky, so it is forwarded to a risk assessment agent (which may include a human user or a computer bot) for further review. If fraud does appear to be present based on the further review, the risk assessment agent may take an "action", such as suspending the transaction, canceling the transaction, requesting further verification or authentication from either the seller or buyer, etc. The percentage of cases in which such an "action" is taken on the transactions forwarded to the risk assessment agent may be referred to as the "action rate." For example, if 100 transactions are forwarded to the risk assessment agent for review, and an action is taken on 10 of these transactions, then the action rate is 10%.

According to the various aspects of the present disclosure, if the action rate is below a predetermined percentage (e.g., <30%), then the trendy item threshold 410 is adjusted upward. The rationale is that, a low action rate means that most of the seemingly "suspicious" transaction that are forwarded for review are actually legitimate transactions, which means that the threshold 410 may have been set too low. In other words, the low threshold 410 caused items that were not sufficiently trendy to be considered trendy, which led to too many legitimate (and not risky) transactions to be forwarded to the risk assessment agent for review. This leads to a waste in human or computer resources. Therefore, raising the threshold 410 may more accurately capture the truly trending items, which will cause a smaller number of "risky" transactions to be forwarded to the risk assessment agent for review, but will result in a higher action rate. Conversely, if the action rate is too high, for example above a predetermined percentage (e.g., >70%), that means the threshold 410 may have been set too high, and some risky transactions involving truly trending items are not caught, because those truly trending items are falsely considered not trending (due to the threshold 410 being too high). Therefore, if the action rate is above a predetermined percentage, then the threshold 410 is adjusted downward.

In any case, returning to the example of FIG. 4, the trending threshold 410 has been calculated as having a value of 45.83 by week 9. Since the count of the bi-gram "Galaxy S9" at week 9 is 130—which exceeds the value of 45.83 of the trending threshold 410—the bi-gram "Galaxy S9" is determined to have become trendy at week 9, and the underlying item associated with the bi-gram "Galaxy S9" is determined to have become trendy at week 9 as well. It is understood that in some embodiments, calculations similar to those discussed above may be performed periodically (e.g., in each week) until the item has been determined to have become trendy. Of course, the MA, MSD, and trendy item threshold may also need to be continuously updated based on the most recent time period's bi-gram count numbers. For example, had the bi-gram count for week 9 been less than 45.83, then the same calculations may be performed again in week 10, but with updated MA, MSD, and trendy item threshold values that also take week 9's bi-gram number into account.

In some embodiments, in order to filter out unwanted bi-grams and to reduce the calculation costs, a predefined criterion may be applied to all bi-grams before the trendy item calculations are carried out, so as to filter out a subset of bi-grams that are highly unlikely to have become trendy. For example, the criterion is to include only bi-grams whose frequency of occurrence increased by at least 50% over the preceding time period. In the example discussed above with reference to table 1 and FIG. 4, the bi-gram for week 9 would pass this criterion since week 9's count of 130 is over a 50% increase of week 8's count of 40. However, suppose week 9's count had been 50, it would have only been a 25% over week 8's count of 40, in which case it would not have satisfied the criterion and would not have been included in the trendy item determination calculations.

Once an item has been determined to have become trendy, additional scrutiny may be applied to evaluate the risks of transactions involving the item. This is because trendy items are often used by scam artists to make some quick cash, as trendy items tend to attract the interest from a large volume of legitimate buyers. As such, in addition to passing the standard risk evaluation procedures, transactions involving trendy items may need to undergo another set of stricter risk evaluation procedures before being approved. For example, a risk score may be calculated for a transaction based on various factors such as the seller's history, the buyer's history, monetary amount of transaction, type of goods sold in the transaction, etc. If a risk score exceeds a predetermined risk score threshold, the transaction may be deemed too risky and may be put on hold or denied altogether. Here, if a transaction is determined to involve a trendy item, then the risk score may be increased by a predetermined number of points. The increase in the risk score reflects the riskier nature of the transaction. As another example, transactions involving trendy items may be limited to a certain amount (e.g., $500), beyond which the transaction may be put on hold or denied. As yet another example, restrictions may be put in place for the funds of transactions involving the trendy items. In some embodiments, the seller may not have access to the funds for a longer period of time (e.g., 2 weeks versus 1 day) than transactions not involving trendy items. In other embodiments, a limit may be placed on the amount of money the sellers may withdraw from selling the trendy item.

In some embodiments, the profiles of the sellers may also be analyzed in order to assess the risk of the transactions involving trendy items. One aspect of the merchant profile is the size of the merchant. For example, large merchants that sell many different products are typically more reliable than small merchants that sell just one or two products. Stated differently, large merchants are less motivated to risk damaging their reputation by selling a fake/counterfeit product or by selling by not delivering a product altogether. Hence, as a part of the additional risk assessment of transactions involving trendy items, the size of the merchant may be taken into account, for example when determining the risk score. The size of the merchant may be measured by a total sales volume per unit period (e.g., per day or per week), or by a total number of products offered for sale by that merchant. Even if an item has gone trendy, a transaction involving a larger merchant (e.g., having a sales volume exceeding a predefined number) selling the trendy item may have its risk score increased slightly, or none at all, whereas a smaller merchant (e.g., having a sales volume below a predefined number) may have its risk score increased significantly.

Another aspect of the merchant profile is the prior history of the merchant. If the merchant has previously sold many trendy items—which may be the same type or different types—and has not received any complaint (or very few complaints), that is an indication that the merchant is reliable and that the transactions involving the trendy items are likely to be legitimate. Consequently, the risk score need not be raised much (if at all) for such merchants. Conversely, if the merchant has not had a history of selling trendy items but is now selling many trendy items, the risk score for that merchant may be raised significantly, even if the merchant is a large merchant.

Yet another aspect of the merchant profile is the inventory of the merchant. If a large percentage (above a predefined limit) of a merchant's inventory are items that are not trendy, that is an indication that the merchant is not intending to defraud people by selling a few trendy items along with many non-trendy items. Therefore, the risk score for the transactions involving the trendy items for these sellers need not be raised much, if at all, even if the merchant is a relatively small merchant. On the other hand, if a large percentage (above a predefined limit) of a merchant's inventory are trendy items, that may be a cause for concern, even if the merchant is a relatively large merchant. Therefore, the risk score for the transactions involving the trendy items for these sellers may be raised substantially.

In addition to merchant profiles, the specific types of items that are becoming trendy may also be analyzed to evaluate the transaction risks. For example, if a trendy item is a type of item (e.g., electronics) that has a high profit margin or a high sales price above a predefined threshold, that may be a type of item that draws the attention of fraudsters and therefore should be evaluated more carefully (e.g., by increasing the risk score). If the trendy item is a type of item (e.g., toys or household items) that has a low profit margin or a low sales price below a predefined threshold, that may be a type of item that typically does not draw the attention of fraudsters and therefore may be evaluated less carefully (e.g., by not increasing the risk score).

Another type of item profile is whether it is a seasonably trendy item. In more detail, some trendy items are only trendy at certain recurring time periods, such as annual holidays. For example, costumes and/or candy may be trendy during Halloween, and toys and/or Christmas decorations may be trendy during Christmas. These types of trendy items that are only trendy during certain "seasons" or predetermined time periods are less likely to involve fraud. As such, the trend detection program 200 may examine the history of a trendy item, for example by examining whether it was trendy at recurring annual cycles (or another time interval). If the history analysis of a given item indicates that it is only seasonably trendy, the risk score need not be increased much, if at all.

In addition to the item profiles discussed above, historical information of an item or a similar item in a series of items may also be considered to be a part of the item profile. For example, the Samsung™ Galaxy S9 is a unique product, but it is a part of the Samsung™ Galaxy line of smartphones. If the previous Galaxy phones (e.g., the Galaxy S8, Galaxy S7, etc.) had become trendy and had generated large losses due to fraud, then additional scrutiny is warranted for the Galaxy S9 phone. The Galaxy S9 and the previous Galaxy series of phones may be determined to be related because they all share the bi-gram "Samsung Galaxy", which may have become trendy when the previous Galaxy series of smartphones were released. Thus, when the bi-gram "Samsung Galaxy" becomes trendy again due to the release of the Samsung™ Galaxy S9 phone, the trend detection program 200 may recognize that the Samsung™ Galaxy S9 phone is a successor of the previous Samsung™ Galaxy phones. The bi-gram "Samsung Galaxy" may also be linked to the bi-gram "Galaxy S9", since they almost always appear together in a text string corresponding to the description or title of the phone. In this manner, the previous trending history or loss history of an item or a family of items may also be used to raise (or lower) the risk score of a currently trending item.

It is understood that although the discussions above focus on determining when an ordinary item becomes trendy, the same concepts may apply to determining when a trendy item loses its trendiness too. For example, the trend detection program 200 may still generate bi-grams and determine the frequency of occurrence of bi-grams at periodic time intervals even after items have become trendy. If an item that had been trendy starts to drop in its associated bi-gram count, for example below a predetermined threshold, that item may be determined to no longer be trendy. This predetermined threshold may also be defined as a function of MA and/or MSD in some embodiments. For example, such a predetermined threshold may be defined as being a Y number of MSD below the MA. Once a previously trendy item has been determined to no longer be trendy, less stringent risk assessment procedures may be applied to the transactions involving the item. For example, once a previously trending item has been determined to be no longer trending, the previously elevated risk score may be lowered for transactions involving such an item.

Figure 5:
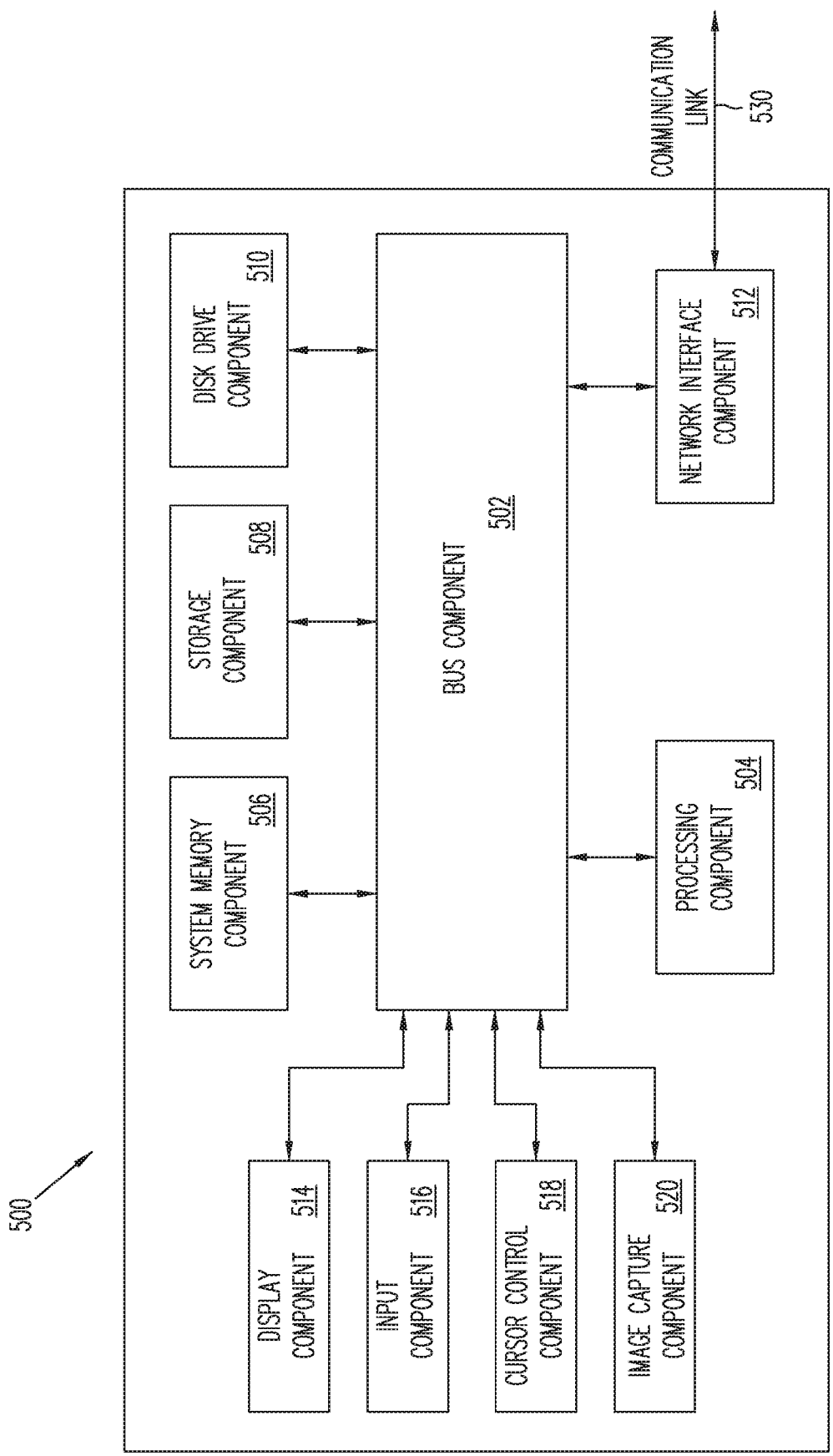
FIG. 5 is an example computer system according to various aspects of the present disclosure.

FIG. 5 is a block diagram of a computer system 500 suitable for implementing various methods and devices described herein, for example, the trend detection program 200, or the user device 110, the merchant server 140, or the payment provider server 170. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the trend detection program 200 and the various method steps of the method 700 discussed below (or the user device 110, the merchant server 140, or the payment provider server 170) may be implemented as the computer system 500 in a manner as follows.

In accordance with various embodiments of the present disclosure, the computer system 500, such as a network server or a mobile communications device, includes a bus component 502 or other communication mechanisms for communicating information, which interconnects subsystems and components, such as a computer processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure. In some embodiments, the various components of the trend detection program 200 may be in the form of software instructions that can be executed by the processor 504 to automatically perform context-appropriate tasks on behalf of a user.

Logic may be encoded in a computer readable medium, which may refer to any medium that participates in providing instructions to the processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the trendy program determination program 200 discussed above.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the trend detection program 200 and external devices, for example with the user device 110, with the merchant server 140, or with the payment provider server 170, depending on exactly where the trend detection program 200 is implemented.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the trend detection program 200 may be implemented as such software code.

Figure 6:
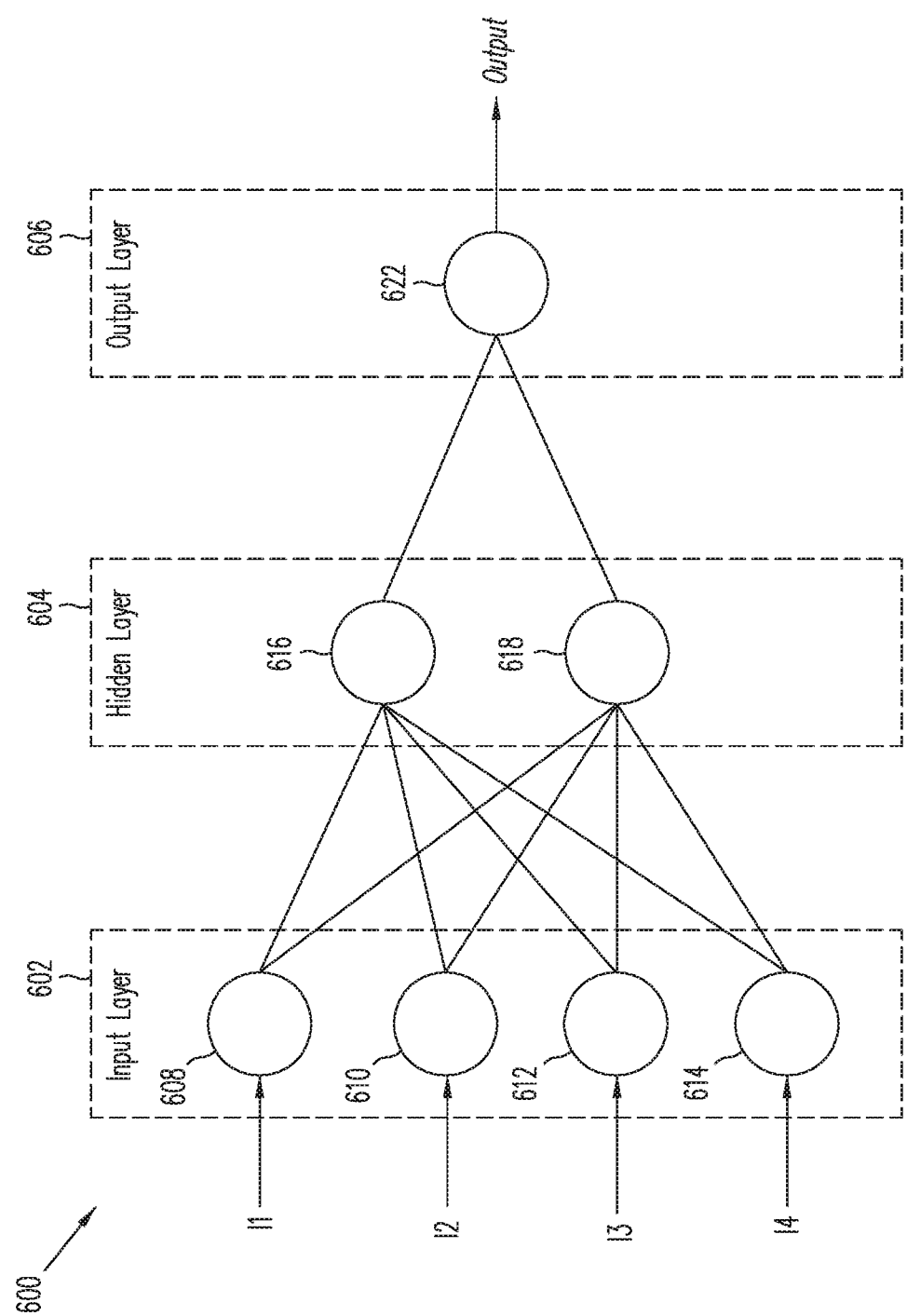
FIG. 6 illustrates an example artificial neural network according to various aspects of the present disclosure.

It is understood that machine learning may be used to refine the various aspects of the trend detection program 200. The machine learning may be performed at least in part via an artificial neural network. In that regard, FIG. 6 illustrates an example artificial neural network 600. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement the trend detection program 200, and the trend detection program 200 may include as many hidden layers as necessary.

In this example, the artificial neural network 600 receives a set of input values and produces an output value. Each node in the input layer 602 may correspond to a distinct input value. For example, when the artificial neural network 600 is used to implement the trend detection program 200, each node in the input layer 602 may correspond to a distinct attribute of a transaction. In a non-limiting example, the node 608 may correspond to a transaction amount, the node 610 may correspond to a size of a merchant, the node 612 may correspond to a trendy item's contribution to a total sales volume of a merchant, the node 614 may correspond to a history of losses incurred in an online marketplace, and so forth.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that each of the nodes 616-618 may produce a different value based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement the trend detection program 200, the output value produced by the artificial neural network 600 may indicate a likelihood of an event (e.g., a dispute event, a chargeback event, etc.) associated with the transaction.

The artificial neural network 600 may be trained by using training data. By providing training data to the artificial neural network 600, the nodes 616-618 in the hidden layer 604 may be trained (adjusted) such that an optimal output (e.g., determining a value for a threshold) is produced in the output layer 606 based on the training data. By continuously providing different sets of training data, and penalizing the artificial neural network 600 when the output of the artificial neural network 600 is incorrect (e.g., when the determined (predicted) likelihood is inconsistent with whether the event actually occurred for the transaction, etc.), the artificial neural network 600 (and specifically, the representations of the nodes in the hidden layer 604) may be trained (adjusted) to improve its performance in data classification. Adjusting the artificial neural network 600 may include adjusting the weights associated with each node in the hidden layer 604.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm— which may be a non-probabilistic binary linear classifier— may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Figure 7:
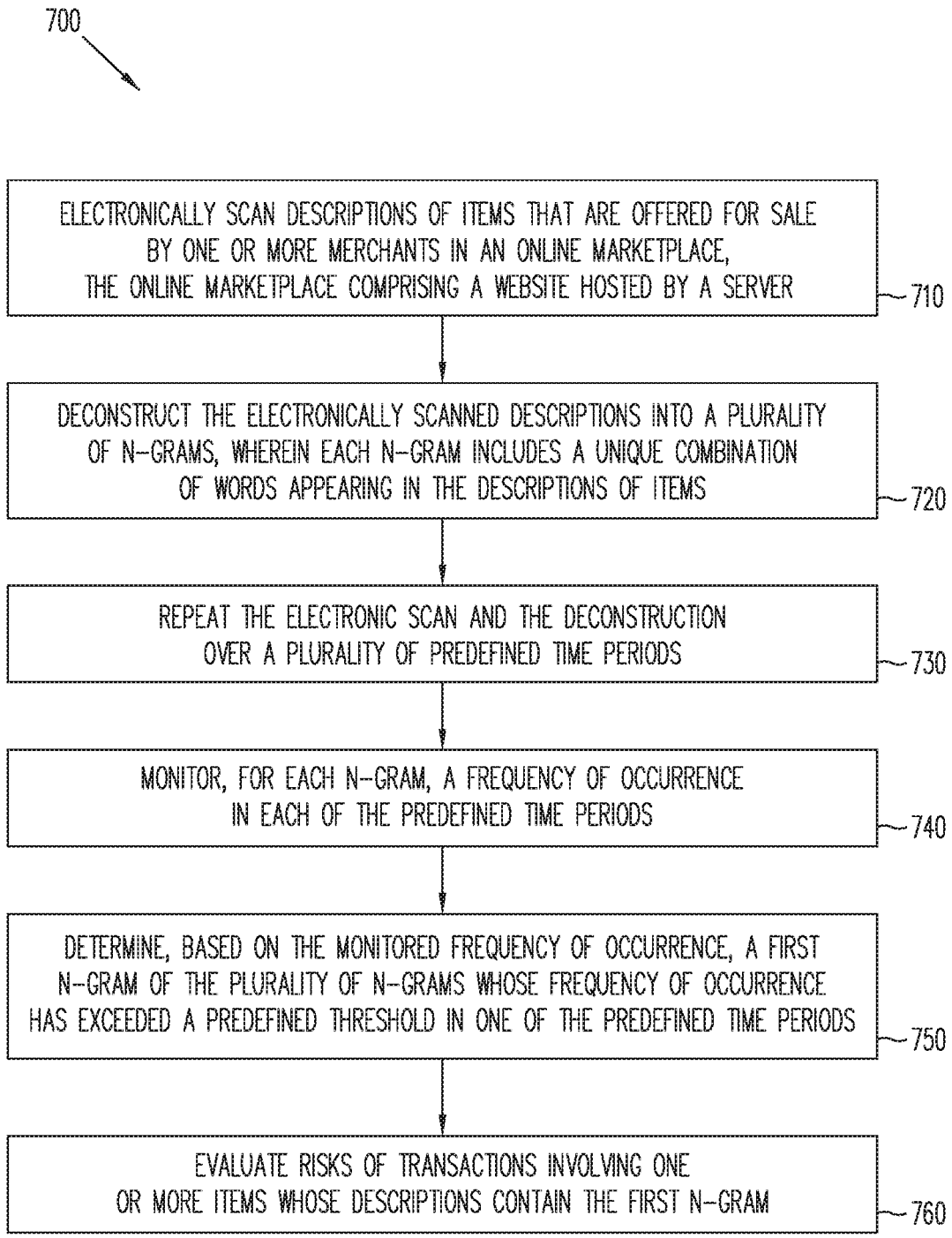
FIG. 7 is a flowchart illustrating a method of determining trending items according to various aspects of the present disclosure.

FIG. 7 is a flowchart illustrating a method 700 for automatically determining trendy items according to various aspects of the present disclosure. The various steps of the method 700 may be performed by one or more electronic processors. In some embodiments, the method 700 may be performed by the trend detection program 200 discussed above.

The method 700 includes a step 710 to electronically scan descriptions of items that are offered for sale by one or more merchants in an online marketplace. The online marketplace comprises a website hosted by a server.

The method 700 includes a step 720 to deconstruct the electronically scanned descriptions into a plurality of N-grams. Each N-gram includes a unique combination of words appearing in the descriptions of items.

The method 700 includes a step 730 to repeat the electronic scan and the deconstruction (e.g., steps 710 and 720) over a plurality of predefined time periods.

The method 700 includes a step 740 to monitor, for each N-gram, a frequency of occurrence in each of the predefined time periods.

The method 700 includes a step 750 to determine, based on the monitored frequency of occurrence, a first N-gram of the plurality of N-grams whose frequency of occurrence has exceeded a predefined threshold in one of the predefined time periods. In some embodiments, the step 750 may also determine trendy sellers that are not necessarily selling trendy items.

The method 700 includes a step 760 to evaluate risks of transactions involving one or more items whose descriptions contain the first N-gram. In some embodiments where a trendy seller is identified (regardless of whether the trendy seller is selling trendy items or non-trendy items), the step 760 may be performed to evaluate the risk of transactions involving such trendy sellers.

In some embodiments, the electronic scan of step 710 comprises electronically scanning a plurality of text strings. The description of each item corresponds to one or more text strings of the plurality of text strings. In some embodiment, the electronic scan of step 710 comprises sampling, from a plurality of merchants of different sizes, prospective transactions containing the items, wherein a same number of transactions is sampled from each merchant.

In some embodiments, the deconstruction of step 720 comprises deconstructing each of the electronically scanned text strings into a plurality of different bi-grams. The different bi-grams are a form of N-grams.

In some embodiments, the monitoring of step 740 comprises: calculating a moving average and a moving standard deviation associated with the first N-gram over the plurality of predefined time periods; and calculating the predefined threshold as a function of the moving average and the moving standard deviation.

In some embodiments, the evaluation of step 760 comprises: determining whether the predefined time period during which the frequency of occurrence of the first N-gram exceeded the predefined threshold includes a holiday, evaluating the transactions involving the one or more items with a first risk level in response to the determining indicating that the predefined period includes the holiday, or evaluating the transactions involving the one or more items with a second risk level in response to the determining indicating that the predefined period does not include the holiday, the second risk level being greater than the first risk level.

In some embodiments, the evaluation of step 760 comprises increasing a risk score for at least some of the transactions involving the one or more items. In some embodiments, a monetary value associated with the transactions involving the one or more items is determined. The increasing the risk score is performed in response to a determination that the monetary value of the transactions exceeds a predefined value.

In some embodiments, the evaluation of step 760 comprises: identifying a merchant for each transaction involving the one or more items; determining, for each identified merchant, a revenue derived from selling the one or more items as a percentage of total sales; and increasing a risk score for merchants whose revenue from selling the one or more items exceeds a predefined threshold percentage of the total sales.

In some embodiments, the evaluation of step 760 comprises: determining sizes of merchants for transactions involving the one or more items; and increasing a risk score for transactions conducted by merchants that are below a predefined size.

It is understood that additional method steps may be performed before, during, or after the steps 710-760 discussed above. For example, the method 700 may include a step to determine an action rate for transactions involving the one or more items whose descriptions contain the first N-gram. The action rate includes a percentage of the transactions for which anti-fraud measures have been taken. The method 700 may further include a step to adjust the predefined threshold based on the action rate. In some embodiments, the adjusting step may comprise: adjusting the predefined threshold upwardly in response to the action rate being less than a predefined limit; or adjusting the predefined threshold downwardly in response to the action rate being greater than a predefined limit. For reasons of simplicity, other additional steps are not discussed in detail herein.

Based on the above discussions, it can be seen that the present disclosure offers several significant advantages over conventional methods and systems. It is understood, however, that not all advantages are necessarily discussed in detail herein, different embodiments may offer different advantages, and that no particular advantage is required for all embodiments. One advantage is improved functionality of a computer. For example, by implementing the trend detection program 200 as discussed above, the computers on which the trend detection program 200 are implemented effectively become intelligent machines capable of making context-appropriate decisions on behalf of human users. In other words, the computers with the trend detection program 200 implemented thereon have much more versatile functionalities (e.g., by automatically identifying what items are becoming trendy) compared to conventional computers. The trend detection program 200 further improves the functionality of a computer by improving the speed at which fraudulent transactions can be detected, since the trend detection program 200 does not rely on human users' involvement (which may be slow) to detect potential fraud. Another advantage is that the present disclosure offers additional peace of mind for all parties involved in the online marketplace, due to its effectiveness in catching and preventing fraud associated with trendy items. It also reduces losses incurred as a result of the fraud associated with trendy items. Further, because monitoring of items for trendiness can be dynamic, such as through machine learning, based on numerous factors, the system does not need to spend unnecessary resources monitoring products predicted to have little or no interest, but to then monitor such products at a higher rate when they are predicted to have higher interest so as to not miss out on large numbers of potential fraudulent transactions during heavy buying periods.

Figure 8:
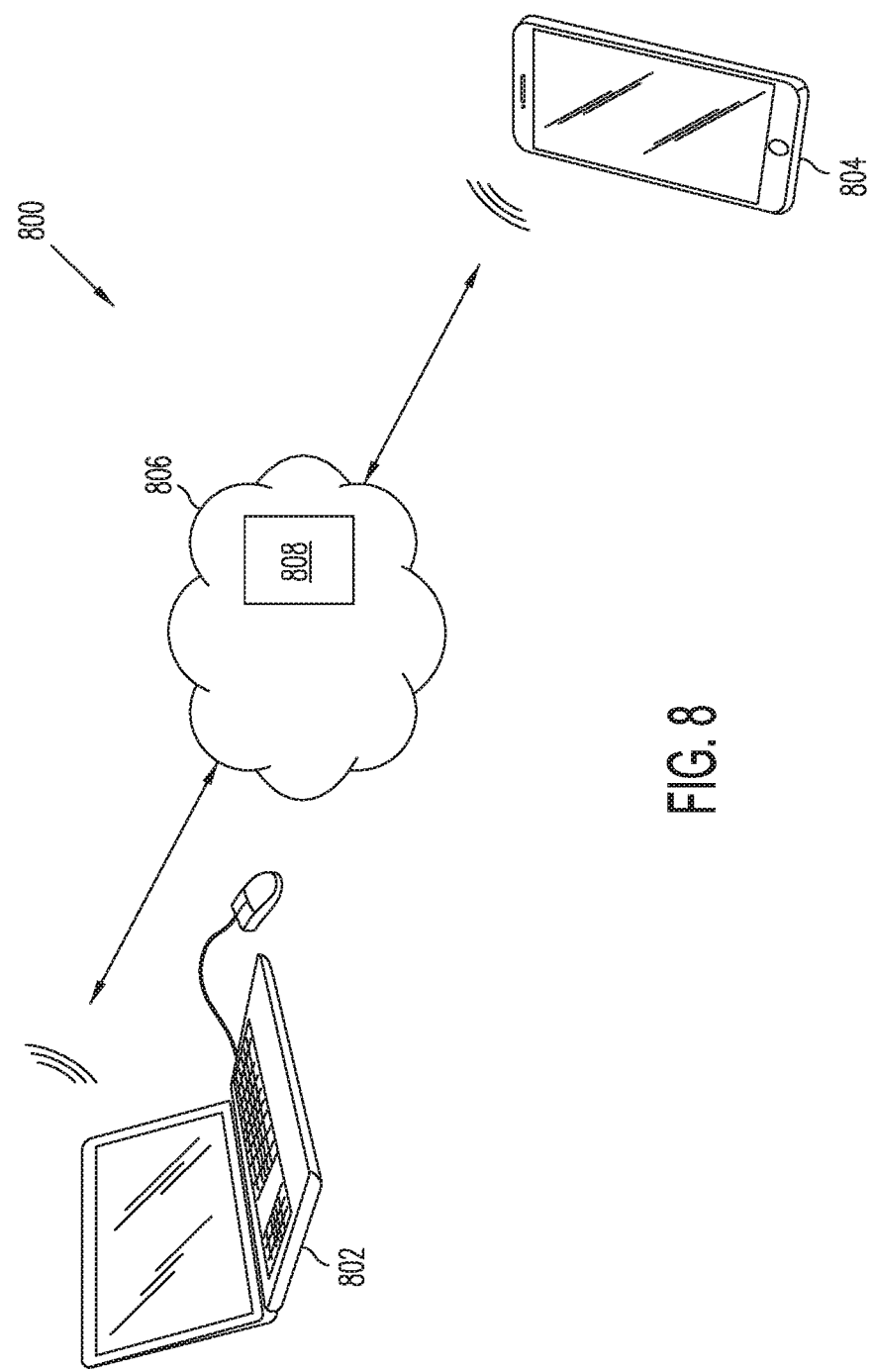
FIG. 8 is a simplified example of a cloud-based computing architecture according to various aspects of the present disclosure.

FIG. 8 illustrates an example cloud-based computing architecture 800, which may also be used to implement various aspects of the present disclosure. The cloud-based computing architecture 800 includes a mobile device 804 (e.g., the user device 110 of FIG. 1) and a computer 802 (e.g., the merchant server 140 or the payment provider server 170), both connected to a computer network 806 (e.g., the Internet or an intranet). In one example, a consumer has the mobile device 804 that is in communication with cloud-based resources 808, which may include one or more computers, such as server computers, with adequate memory resources to handle requests from a variety of users. A given embodiment may divide up the functionality between the mobile device 804 and the cloud-based resources 808 in any appropriate manner. For example, an app on mobile device 804 may perform basic input/output interactions with the user, but a majority of the processing may be performed by the cloud-based resources 808. However, other divisions of responsibility are also possible in various embodiments. In some embodiments, using this cloud architecture, the trend detection program 200 may reside on the merchant server 140 or the payment provider server 170, but its functionalities can be accessed or utilized by the mobile device 804, or vice versa.

The cloud-based computing architecture 800 also includes the personal computer 802 in communication with the cloud-based resources 808. In one example, a participating merchant or consumer/user may access information from the cloud-based resources 808 by logging on to a merchant account or a user account at computer 802. The system and method for automatically identifying trendy items and potentially fraudulent transactions involving the trendy items discussed above may be implemented at least in part based on the cloud-based computing architecture 800.

It is understood that the various components of cloud-based computing architecture 800 are shown as examples only. For instance, a given user may access the cloud-based resources 808 by a number of devices, not all of the devices being mobile devices. Similarly, a merchant or another user may access the cloud-based resources 808 from any number of suitable mobile or non-mobile devices. Furthermore, the cloud-based resources 808 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method that includes the following steps: electronically scanning descriptions of items that are offered for sale by one or more merchants in an online marketplace, the online marketplace comprising a website hosted by a server; deconstructing the electronically scanned descriptions into a plurality of N-grams, wherein each N-gram includes a unique combination of words appearing in the descriptions of items; repeating the electronically scanning and the deconstructing over a plurality of predefined time periods; monitoring, for each N-gram, a frequency of occurrence in each of the predefined time periods; determining, based on the monitoring, a first N-gram of the plurality of N-grams whose frequency of occurrence has exceeded a predefined threshold in one of the predefined time periods; and evaluating risks of transactions involving one or more items whose descriptions contain the first N-gram; wherein one or more of the electronically scanning, the deconstructing, the repeating, the monitoring, the determining, or the evaluating is performed by one or more electronic processors.

Another aspect of the present disclosure involves a system that includes a non-transitory memory and one or more hardware processors coupled to the non-transitory memory and configured to read instructions from the non-transitory memory to cause the system to perform operations comprising: sampling, from an electronic platform where buyers and sellers conduct electronic transactions with another other, a plurality of transactions involving a plurality of products, wherein the sampling is conducted repeatedly over a plurality of time periods; generating, based on the sampled transactions, a plurality of text strings; decomposing each of the text strings into a plurality of N-grams, wherein each N-gram includes an N number of different consecutive words in each of text strings; counting, for each N-gram, a number of times it appears in each of the time periods; detecting, based on the counting, that a first N-gram of the plurality of N-grams has appeared more times than a predefined threshold during a first time period of the time periods; determining, in response to the detecting, that the first N-gram has obtained a first status; and evaluating a risk of a first transaction involving a first product that is associated with the first N-gram.

Yet another aspect of the present disclosure involves a non-transitory machine-readable medium having stored thereon machine-readable instructions executable to cause a machine to perform operations comprising: sampling a plurality of listings from an online marketplace hosted by a server, the plurality of listings involving a plurality of items for sale by a plurality of merchants; obtaining, based on the sampling, a plurality of text strings; generating a plurality of bi-grams using the plurality of text strings; repeating the sampling, the obtaining, and the generating over a plurality of time periods; tallying, during each of the time periods, a number of appearances for each bi-gram; detecting, during a first time period of the plurality of time periods, that a number of appearances of a first bi-gram of the plurality of bi-grams has exceeded a predefined threshold; determining, in response to the detecting, that the first bi-gram has obtained a first status; and processing transactions involving first products that are associated with the first bi-gram at a heightened risk level than transactions that involve second products that are not associated with the first bi-gram.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
    accessing descriptions of items that are offered for sale by one or more merchants in an online marketplace, the online marketplace comprising a website hosted by a server;
    deconstructing the descriptions into a plurality of N-grams, wherein each N-gram includes a combination of words appearing in the descriptions of items;
    repeating the electronically scanning and the deconstructing over a plurality of predefined time periods;
    monitoring, for each N-gram, a frequency of occurrence in each of the predefined time periods;
    determining, based on the monitoring, a first N-gram of the plurality of N-grams whose frequency of occurrence has exceeded a predefined threshold in one of the predefined time periods, wherein the determining indicates that at least one merchant from the one or more merchants is a fraud risk; and
    evaluating, based on the determining, risks of transactions involving one or more items whose descriptions contain the first N-gram;
    wherein one or more of the electronically scanning, the deconstructing, the repeating, the monitoring, the determining, or the evaluating is performed by one or more electronic processors.

2. The method of claim 1, wherein:
    the electronically scanning comprises electronically scanning a plurality of text strings, wherein the description of each item corresponds to one or more text strings of the plurality of text strings; and
    the deconstructing comprises deconstructing each of the electronically scanned text strings into a plurality of different bi-grams, the different bi-grams being a form of N-grams.

3. The method of claim 1, wherein the evaluating comprises:
    determining whether the predefined time period during which the frequency of occurrence of the first N-gram exceeded the predefined threshold includes a predetermined type of shopping event; and
    evaluating the transactions involving the one or more items with a first risk level in response to the determining indicating that the predefined period includes the predetermined type of shopping event; or
    evaluating the transactions involving the one or more items with a second risk level in response to the determining indicating that the predefined period does not include the predetermined type of shopping event, the second risk level being greater than the first risk level.

4. The method of claim 1, further comprising:
    determining an action rate for transactions involving the one or more items whose descriptions contain the first N-gram, the action rate including a percentage of the transactions for which anti-fraud measures have been taken; and
    adjusting the predefined threshold based on the action rate.

5. The method of claim 4, wherein the adjusting comprises:
    adjusting the predefined threshold upwardly in response to the action rate being less than a predefined limit; or
    adjusting the predefined threshold downwardly in response to the action rate being greater than a predefined limit.

6. The method of claim 1, wherein the evaluating comprises increasing a risk score for at least some of the transactions involving the one or more items.

7. The method of claim 6, further comprising: determining a monetary value associated with the transactions involving the one or more items, wherein the increasing the risk score is performed in response to a determination that the monetary value of the transactions exceeds a predefined value.

8. The method of claim 6, wherein the evaluating comprises:
    identifying a merchant for each transaction involving the one or more items;
    determining, for each identified merchant, a revenue derived from selling the one or more items as a percentage of total sales; and
    increasing a risk score for merchants whose revenue from selling the one or more items exceeds a predefined threshold percentage of the total sales.

9. The method of claim 6, wherein the evaluating comprises:
- determining sizes of merchants for transactions involving the one or more items; and
- increasing a risk score for transactions conducted by merchants that are below a predefined size.

10. The method of claim 1, wherein the monitoring comprises:
- calculating a moving average and a moving standard deviation associated with the first N-gram over the plurality of predefined time periods; and
- calculating the predefined threshold as a function of the moving average and the moving standard deviation.

11. The method of claim 1, wherein the electronically scanning comprises sampling, from a plurality of merchants of different sizes, prospective transactions containing the items, wherein a same number of transactions is sampled from each merchant.

12. A system, comprising:
- a non-transitory memory; and
- one or more hardware processors coupled with the non-transitory memory and configured to read instructions from the non-transitory memory to cause the system to perform operations comprising:
  - sampling, from an electronic platform where buyers and sellers conduct electronic transactions, a plurality of transactions involving a plurality of products, wherein the sampling is conducted repeatedly over a plurality of time periods;
  - generating, based on the sampled transactions, a plurality of text strings;
  - decomposing each of the text strings into a plurality of N-grams, wherein each N-gram includes an N number of different consecutive words in each of text strings;
  - counting, for each N-gram, a number of times the N-gram appears in each of the time periods;
  - detecting, based on the counting, that a first N-gram of the plurality of N-grams has appeared more times than a predefined threshold during a first time period of the time periods;
  - determining, in response to the detecting, that the first N-gram has obtained a first status, wherein the determining indicates that at least one seller of the sellers is a fraud risk; and
  - evaluating, based on the determining, a risk of a first transaction involving a first product that is associated with the first N-gram.

13. The system of claim 12, wherein the N-grams include bi-grams that each consists of two consecutive words.

14. The system of claim 12, wherein the sampling comprises sampling, in any of the time periods, an equal number of transactions from at least a first seller and a second seller, the first seller having a first sales volume, and the second seller having a second seller having a second sales volume substantially greater than the first sales volume.

15. The system of claim 12, wherein the evaluating comprises assigning a higher risk score for the first transaction than for a second transaction that involves a second product that is associated with the first N-gram.

16. The system of claim 12, wherein the evaluating comprises evaluating the risk at least in part based on: a price of the first product, a type of the first product, a margin of the first product, a sales volume of a first seller of the first transaction, or a percentage of the sales volume of the first seller attributed to transactions that involve the first product.

17. The system of claim 12, wherein the evaluating comprises:
- analyzing historical data associated with the first N-gram;
- determining, based on the analyzing, whether the first product had previously obtained the first status each year during a time period corresponding to the first time period; and
- assigning a first risk score or a second risk score greater than the first risk score to the first transaction based on the determining, wherein the assigning comprises:
  - assigning the first risk score to the first transaction in response to determining that the first product had previously obtained the first status each year during the time period corresponding to the first time period; or
  - assigning the second risk score to the first transaction in response to determining that the first product had not previously obtained the first status each year during the time period corresponding to the first time period.

18. The system of claim 17, wherein the evaluating comprises:
- determining that the risk of the first transaction exceeds a predefined risk level;
- forwarding the first transaction to a risk assessment agent for further review;
- determining whether the risk assessment agent has taken an anti-fraud measure against the first transaction; and
- adjusting, based on a determination of whether the risk assessment agent has taken the anti-fraud measure, the predefined threshold for future transactions associated with the first N-gram.

19. A non-transitory machine-readable medium having stored thereon machine-readable instructions executable to cause a machine to perform operations comprising:
- sampling a plurality of listings from an online marketplace hosted by a server, the plurality of listings involving a plurality of items for sale by a plurality of merchants;
- obtaining, based on the sampling, a plurality of text strings;
- generating a plurality of bi-grams using the plurality of text strings;
- repeating the sampling, the obtaining, and the generating over a plurality of time periods;
- tallying, during each of the time periods, a number of appearances for each bi-gram;
- detecting, during a first time period of the plurality of time periods, that a number of appearances of a first bi-gram of the plurality of bi-grams has exceeded a predefined threshold;
- determining, in response to the detecting, that the first bi-gram has obtained a first status, wherein the determining indicates that at least one merchant from the plurality of merchants is a fraud risk; and
- processing, based on the determining, transactions involving first products that are associated with the first bi-gram at a heightened risk level than transactions that involve second products that are not associated with the first bi-gram.

20. The non-transitory machine-readable medium of claim 19, wherein the processing the transactions comprises determining the heightened risk level based on:
- whether a size of a merchant offering the first products exceeds a predefined size; or whether a contribution of the first products to a total sales volume of the merchant exceeds a predefined percentage.

* * * * *